Jan. 24, 1928.
C. H. CUNO
1,657,346
FILTER FOR FLUIDS
Filed Jan. 19, 1927
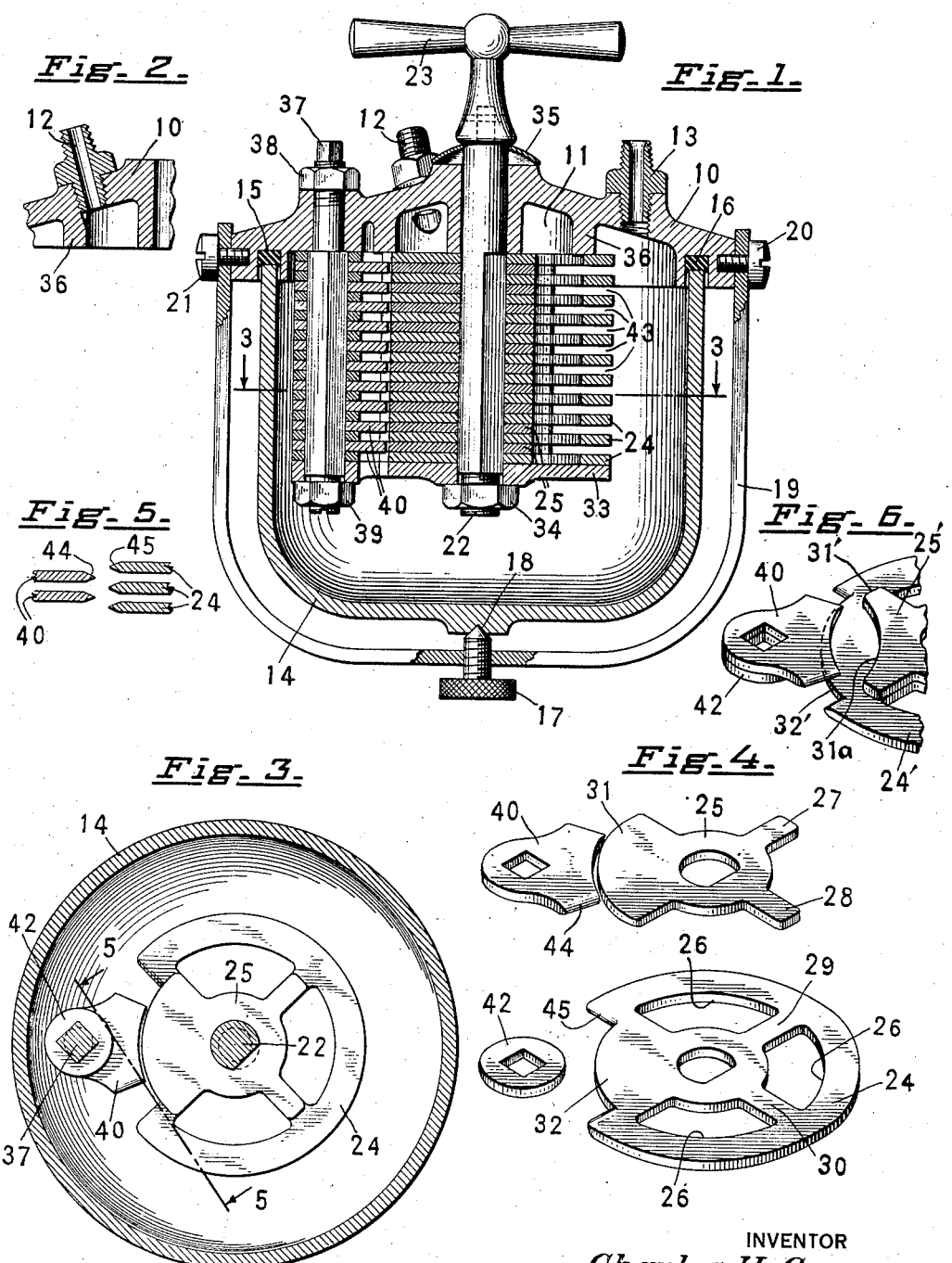
INVENTOR
Charles H. Cuno,
BY
ATTORNEY Patented Jan. 24, 1928.

1,657,346

UNITED STATES PATENT OFFICE.

CHARLES H. CUNO, OF MERIDEN, CONNECTICUT, ASSIGNOR TO THE CUNO ENGINEERING CORPORATION, OF MERIDEN, CONNECTICUT, A CORPORATION OF CONNECTICUT.

FILTER FOR FLUIDS.

Application filed January 19, 1927. Serial No. 162,114.

The main object of my invention is to provide a novel filter for fluids and more particularly for liquid fuels and lubricants, the filtering members of which may be readily cleaned without disassembly.

Another object is to provide a filter in which the filtering members are of a permanent nature and are unlikely to clog, wear out or rot as frequently occurs when a fine foraminous screen, chamois, or similar materials are used for this purpose.

Another object is to produce a filtering device in which the foreign matter eliminated can be readily removed from the collecting container or sump without the use of tools.

Another object is to provide a construction from which the filtering members can be removed as a unit.

Another object is to produce a filtering device in which the cleaning members may be removed as a unit.

In my filter the filtration or straining occurs radially through a number of segmental passages formed between flat wheel-like plates and spacers suitably shaped to rigidly space these plates apart.

The peripheral rims of said plates do not extend throughout an entire circle, but a space is left wherein the cleaning members, which during the cleaning operation traverse the filtration passages, may remain disengaged from the rotary members. This construction allows the removal of the cleaning members as a unit for inspection, or so that they may, themselves, be cleaned, and leaves them in a position such that foreign matter which they may have accumulated during the cleaning operation may be free to fall into the well.

Referring to the drawings, Fig. 1 is a central vertical section of one embodiment of my invention.

Fig. 2 is a fragmentary vertical sectional view of a part of the top plate or cover of Fig. 1.

Fig. 3 is a horizontal partial sectional view of Fig. 1 along the line 3—3.

Fig. 4 is an exploded perspective view of one complete set of filtering segments, spacers and cleaning members.

Fig. 5 is a fragmentary section of Fig. 3 along the line 5—5.

Fig. 6 shows a fragmentary perspective view of a single set of filtering cleaning and spacing members which is a variation from those disclosed in Figs. 1, 3 and 4.

The head 10 which may preferably be diecast contains the circumferential chamber 11 provided with the fitting or connection 12 which is the outlet for the filtered fluid. The head 10 is also provided with the fitting or connection 13 which is the inlet for the fluid to be filtered. The well or sump 14 engages the annular groove 15 and is pressed against the resilient gasket 16 by the thumb screw 17 which engages at 18 with the bottom of the chamber 14 and is held by the swinging yoke 19 which is in turn rotatably connected to the head or cover 10 by the screws 20 and 21.

The shaft 22 may be rotated by the handle 23. Mounted on this shaft are a series of plates 24 alternating with the spacers 25. The plates 24 are provided with the apertures 26 which register one with another forming a vertical passageway for the flow of the filtered fluid. The spacers 25 are provided with arms 27 and 28 which register with the spokes 29 and 30 of the filter plates and with the segments 31 which register with the segments 32. These plates 24 and spacers 25 are suitably constructed to revolve with the shaft 22. The bottom plate 33 is held in place by the nut 34. The spring washer 35 insures a firm and yielding contact between the upper plate of the assembly and the outer wall 36 of the chamber 11.

Parallel to shaft 22 is the stud 37 which is held in place in the head 10 by the nut 38. Supported on this stud and held in place by the nut 39 is the cleaning assembly consisting of alternate cleaning members 40 and washers 42.

In the assembly the cleaners 40 are in the same plane as the spacers 25 and the washers 42 are in the same plane as the filtering plates 24.

In the filtering position shown in Fig. 3, the cleaning members 40 are entirely free of engagement from the filtration passages 43 but upon rotation of the shaft 22, these cleaning members enter the filtration spaces and with a full rotation of the shaft 22 will remove all dirt and foreign matter from the filtration passages which will then drop down into the bottom of the well 14 from which it may be readily removed when necessary. The edges 44 of the cleaners 40 and the radial edges 45 are preferably finned out or bevelled to facilitate meshing. As the cleaners are normally clear of the filter plates they may be more easily cleaned.

In Fig. 6 a different arrangement of plates, cleaning members, and spacers is shown. In this case the radius of the segment 32' of the plate 24' is slightly greater than the extreme radius of the segment 31' of the spacer 25' so that upon rotation of the filtration element the tips of the cleaning members 40 will remain engaged between the edges of the segments 32' and as the engaging groove so formed is in the plane of the filtration passages 43 the alignment of the cleaning members 40 with the filtration passages is assured although the filtration passages are not at all interfered with by the cleaning members in the normal filtering position. The segment 31' of the spacer 25' is shaped as shown at 31ª so that upon the removal of the nut 38 from the stud 37 the entire cleaning assembly may be swung about 37 as an axis and the cleaning members will become entirely disengaged from the filtering members and may be removed for inspection or so that they may themselves be cleaned.

By changing the thickness of the cleaning members 40 and spacers 25, the fineness of filtration may be altered. The cleaners 40 may be formed of sheet metal or wire suitably spaced on the post or stud 37. For purposes of clarity much larger passages are shown in Fig. 1 than would generally be used for lighter fluids or liquids, such as gasoline, but such passages may be larger for use with the heavier fuel oils, such as are used for marine propulsion, heating plants and the like.

Although I have shown the preferred construction it should be understood that so far as the broad invention is concerned the spacers 25 may be formed as integral bosses or parts of the filtering members 24.

I claim:—

1. A filter comprising a casing having an inlet and an outlet, a series of perforated segmental filtering plates having filtering passages between them and delivery passages through them, spacers between the inner parts of said plates, and spaced cleaner plates normally disengaged from the filtering passages, said cleaner plates and filtering plates having bevelled edges to facilitate meshing of the plates for cleaning the filtering plates.

2. A filter comprising a casing head having an inlet and an outlet, a body detachably secured thereto, a filter assembly rotatably and detachably secured to the head and comprising perforated plates and spacers between said plates, and a cleaner assembly detachably secured to said head and removable independently of the filter assembly, said cleaner assembly comprising a series of cleaning members normally out of the way of the filtering passages, one of said assemblies being movable with respect to the other assembly whereby the cleaning members relatively move between the filter plates.

3. A filter comprising a casing head having a manifold, an inlet and an outlet, said outlet being situated within said manifold and said inlet without said manifold, a well detachably secured to said casing head, a filtering member consisting of a series of spoked segmental filter plates separated so as form radial filtration passages by an alternated series of spoked separators, and a series of cleaning members normally disengaged with said filtering passages but in the planar alignment with said filtration passages so that upon rotation of said filtering members said cleaning members will engage with said radial filtration passages.

4. In a filter, a filtering assembly having a plurality of radial filtration passages, and a cleaning assembly having a plurality of cleaning members normally disengaged from said filtration passages but capable of engagement therewith during cleaning, said cleaning members being adapted to be removed as a unit without their disassembly.

5. A filter comprising a header having an inlet and an outlet, and a well removably secured to said header, a series of plates having a segmental rim and spokes, the apertures between said spokes registering and forming ducts, said plates being spaced apart so as to form radial filtration passages between the said rims, and an assembly consisting of a plurality of means for cleaning said passages, said means being normally disengaging from said passages, and said assembly being removable as a whole (without disassembly).

6. In a filter, a filtration member having radial filtering passages and delivery passages normal to the plane of said filtering passages, and cleaning members normally disengaged from said filtering members but capable of engagement therewith upon angular displacement of said filtration member with respect to said cleaning members.

7. In a filter, a body, a filtration member consisting of a series of spaced filtering plates, and a cleaning member consisting of a series of spaced cleaning plates either of said members being removable from said body independently of the remaining member.

8. In a filter, a filtration member having radial filtering passages and delivery passages normal to the plane of said filtering passages, and cleaning members normally disengaged from said filtering members but capable of engagement therewith upon angular displacement of said filtration member with respect to said cleaning members, said filtration member being removably held in said filter.

9. A filter for fluids having in combination a filtration member having radial filtration passages and axial ducts, cleaning members normally disengaged from said filtration passages but engageable therewith upon rotation of said filtration members, said filtration members having aligning means to ensure engagement of said cleaning members in said passages upon rotation of said filtration members.

10. A filter for fluids comprising a filtering member consisting of a series of spaced segmental wheel like plates having a rim and spokes, said rims forming radial filtration passages normally unobstructed and the apertures between said spokes registering and forming fluid carrying ducts, cleaning members which engage said passages only upon angular displacement of said filtering member, and means for ensuring the engagement of said cleaning members in said passages.

11. In a filter, a combination with a casing having supply and outlet passages therethrough, of a group of spaced plates mounted within said casing between said passages to filter a fluid through the spacing of said plates, another group of spaced plates within the casing, and means extending outside the casing for relatively moving the two groups of plates into and out of contiguous overlapping engagement to clean the filtering spaces of any dirt.

12. In a filter, a combination with a casing having supply and outlet passages therethrough, of a group of spaced plates mounted within said casing between said passages to filter a fluid through the spacing of said plates, spaced rigid projections within the casing, and means for relatively moving the plates and projections into and out of contiguous overlapping engagement to clear the spaces between said plates of any dirt, at least a portion of the edges of said plates being bevelled to facilitate entry of said projections between the plates.

13. In a filter, a combination with a casing having supply and outlet passages therethrough, of a group of spaced plates mounted within said casing between said passages to filter a fluid through the spacing of said plates, another group of spaced plates within the casing and normally occupying a position out of the filter spaces of the first group of plates, and means for relatively moving the two groups of plates to pass the second mentioned group into and entirely out of the filter spaces in the first group of plates to clean said spaces of any dirt.

14. In a filter, a combination with a casing having supply and outlet passages therethrough, of a group of spaced plates mounted within said casing between said passages to filter a fluid through the spacing of said plates, another group of spaced plates within the casing and normally disengaged from the plates of the first mentioned group, means for relatively moving the two groups of plates into and out of contiguous overlapping engagement to clean the filtering spaces of any dirt, and means for mounting each group of plates in a manner to permit their separate removal for cleaning as a unit.

15. In a filter, a combination with a casing having supply and outlet passages therethrough, of a group of spaced plates mounted within said casing between said passages to filter a fluid through the spacing of said plates, another group of spaced plates within the casing and normally disengaged from the plates of the first mentioned group, and means for relatively moving the two groups of plates into and out of contiguous overlapping engagement to clean the filtering spaces of any dirt, one group of said plates being fixed with respect to said casing and the other group of plates being rotatable into and out of engagement with the first group.

16. In a filter, a combination with a casing having supply and outlet passages therethrough, of a group of spaced plates mounted within said casing between said plates, another group of spaced plates within the casing and normally disengaged from the plates of the first mentioned group, and means for relatively moving the two groups of plates into and out of contiguous overlapping engagement to clean the filtering spaces of any dirt, at least a portion of the edges of one group of plates being bevelled on both sides to facilitate said overlapping engagement.

17. A filter comprising a casing having an inlet and outlet, a group of spaced plates within the casing between said inlet and outlet arranged to filter a fluid through the spacing of said plates, an edge of each plate of the group being recessed and the plates disposed with said recesses in alignment, another group of plates within the casing shaped to normally extend into the aligned recesses in the first group of plates, and spaced for insertion between plates of the first group, and means for relatively moving the two groups of plates to cause the second group to travel along and clean the filter spaces of the first group.

18. A filter comprising a casing having an inlet and outlet, a group of spaced curved plates within the casing between the inlet and outlet arranged to filter a fluid through the spacing of said plates and provided with a passage extending longitudinally through the group of plates intermediate their edges, an edge of each plate of the group being recessed and the plates disposed with said recesses in alignment, another group of spaced plates within the casing shaped and mounted to normally extend into the aligned recesses in the first group of plates and arranged for insertion between the plates of the first group, and means for relatively rotating one of said group of plates to cause the second group to engage between the plates of the first group and travel along and clean the filter spaces of the first group.

19. A filter comprising a casing having an inlet and outlet, a group of spaced plates substantially circular in contour mounted for rotation as a unit within the casing to filter fluid passing between said inlet and outlet through the spacing of said plates, having a longitudinal passage extending through the group of plates and around the axis of rotation but inwardly of the periphery, an edge of each plate of the group being recessed and the plates disposed with said recesses in alignment, means extending outside the casing for rotating said group of plates, another group of spaced plates fixedly mounted with respect to the casing to normally extend into the the aligned recesses in the first group of plates, spaced for insertion between the plates of the first group and long enough to extend from the periphery to said longitudinal passage in the first group when the plates of the first group are rotated to engage the plates of the second group for cleaning the filter spaces.

CHARLES H. CUNO.